United States Patent
Wang et al.

(10) Patent No.: US 11,402,965 B2
(45) Date of Patent: Aug. 2, 2022

(54) OBJECT DISPLAY METHOD AND APPARATUS FOR SIMULATING FEELING OF BLIND PERSON AND STORAGE MEDIUM

(71) Applicant: Tencent Technology (Shenzhen) Company Limited, Shenzhen (CN)

(72) Inventors: Zihao Wang, Shenzhen (CN); Mingyi Deng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/321,231

(22) Filed: May 14, 2021

(65) Prior Publication Data
US 2021/0271373 A1 Sep. 2, 2021

Related U.S. Application Data

(63) Continuation of application No. PCT/CN2020/077455, filed on Mar. 2, 2020.

(30) Foreign Application Priority Data

Apr. 3, 2019 (CN) .......................... 201910267940.X

(51) Int. Cl.
*G06F 3/0481* (2022.01)
*G06F 3/0484* (2022.01)
(Continued)

(52) U.S. Cl.
CPC .......... *G06F 3/04815* (2013.01); *G06F 3/016* (2013.01); *G06F 3/0484* (2013.01); *G06F 3/0488* (2013.01); *G06T 7/70* (2017.01)

(58) Field of Classification Search
CPC .... G06F 3/016; G06F 3/04815; G06F 3/0484; G06F 3/0488; G06F 2203/04809; G06T 7/70
See application file for complete search history.

(56) References Cited

U.S. PATENT DOCUMENTS

2010/0231540 A1* 9/2010 Cruz-Hernandez ..... G06T 15/04
345/173
2012/0327001 A1* 12/2012 Higginson .......... G06F 3/04886
345/173
(Continued)

FOREIGN PATENT DOCUMENTS

CN 101827207 A 9/2010
CN 104902161 A 9/2015
(Continued)

OTHER PUBLICATIONS

"Beyond Eyes" Game Review, Sep. 27, 2018, 7 pgs., Retrieved from the Internet: https://mbd.baidu.com/newspage/data/landingsuper?context=%7B%22nid%22%3A%22news_9596885946476939862%22%7D&n_type=-1&p_from=-1.
(Continued)

*Primary Examiner* — Afroza Chowdhury
(74) *Attorney, Agent, or Firm* — Morgan, Lewis & Bockius LLP

(57) ABSTRACT

This application discloses a method for simulating a feeling of a blind person touching an object on a touch screen of a terminal, and belongs to the field of human-machine interaction. The method includes: displaying a user interface of an application on the touchscreen, the user interface being an interface configured to display a three-dimensional virtual environment including multiple objects, and a mask layer being overlaid on the user interface and exposing a limited region of the three-dimensional virtual environment; receiving an interactive operation triggered by a user on a target
(Continued)

area of the user interface on the touchscreen; displaying, in the target area according to the interactive operation, an outline of an object located in the three-dimensional virtual environment. This application can truly simulate an effect of touching an object in the dark by a blind person and presenting a three-dimensional outline of the object in the blind person's mind.

20 Claims, 10 Drawing Sheets

(51) Int. Cl.
  *G06F 3/0488* (2022.01)
  *G06F 3/01* (2006.01)
  *G06F 3/04815* (2022.01)
  *G06T 7/70* (2017.01)

(56) References Cited

U.S. PATENT DOCUMENTS

2016/0253067 A1    9/2016  Webb et al.
2018/0189598 A1*   7/2018  Cheung ................. G06V 20/20

FOREIGN PATENT DOCUMENTS

| CN | 106447623 A | 2/2017 |
| CN | 107038745 A | 8/2017 |
| CN | 108428256 A | 8/2018 |
| CN | 108536288 A | 9/2018 |
| CN | 108619721 A | 10/2018 |
| CN | 108694190 A | 10/2018 |
| CN | 108744510 A | 11/2018 |
| CN | 109992175 A | 7/2019 |

OTHER PUBLICATIONS

Tencent Technology, ISR, PCT/CN2020/077455, Jun. 8, 2020, 3 pgs.
Tencent Technology, WO, PCT/CN2020/077455, Jun. 8, 2020, 5 pgs.
Tencent Technology, IPRP, PCT/CN2020/077455, Sep. 28, 2021, 6 pgs.

* cited by examiner

OBJECT DISPLAY METHOD AND APPARATUS FOR SIMULATING FEELING OF BLIND PERSON AND STORAGE MEDIUM

CROSS-REFERENCE TO RELATED APPLICATIONS

This application is a continuation application of PCT Patent Application No. PCT/CN2020/077455, entitled "OBJECT DISPLAY METHOD AND APPARATUS FOR SIMULATING EXPERIENCE OF BLIND PERSON, AND STORAGE MEDIUM" filed on Mar. 2, 2020, which claims priority to Chinese Patent Application No. 201910267940.X, filed with the State Intellectual Property Office of the People's Republic of China on Apr. 3, 2019, and entitled "OBJECT DISPLAY METHOD AND APPARATUS FOR SIMULATING FEELING OF BLIND PERSON AND STORAGE MEDIUM", all of which are incorporated herein by reference in their entirety.

FIELD OF THE TECHNOLOGY

This application relates to the field of human-machine interaction, and in particular, to an object display method and apparatus for simulating a feeling of a blind person and a storage medium.

BACKGROUND OF THE DISCLOSURE

Blind persons are those with visual impairment. Congenital blind persons have no experience of colors, and therefore have no concept for colors.

Normal persons cannot comprehend daily feelings of the blind persons. Since normal persons have visual experience of daily objects, they can imagine corresponding shapes and colors of objects they touch even if they are blindfolded. Therefore, normal persons who are blindfolded cannot feel true daily feelings of the blind persons.

Currently, there are technical solutions that allow normal persons to experience feelings of the congenital blind persons.

SUMMARY

Embodiments of this application provide a method for simulating a blind person touching an object on a touch screen performed by a terminal having a processor and memory storing a plurality of programs to be executed by the processor, the method comprising:

displaying a user interface of an application on the touchscreen, the user interface being an interface configured to display a three-dimensional virtual environment including multiple objects, and a mask layer being overlaid on the user interface and exposing a limited region of the three-dimensional virtual environment;

receiving an interactive operation triggered by a user on a target area of the user interface on the touchscreen; and displaying, in the target area according to the interactive operation, an outline of an object located in the three-dimensional virtual environment.

An apparatus for simulating a blind person touching an object on a touch screen includes:

a display module configured to display a user interface of an application on the touchscreen, the user interface being an interface configured to display a three-dimensional virtual environment including multiple objects, and a mask layer being overlaid on the user interface and exposing a limited region of the three-dimensional virtual environment; and an interaction module configured to receive an interactive operation triggered by a user on a target area of the user interface on the touchscreen; where the display module is configured to display, in the target area according to the interactive operation, an outline of an object located in the three-dimensional virtual environment.

A computer device includes a processor and a memory storing computer readable instructions, the computer readable instructions causing, when executed by the processor, the processor to perform steps of the method for simulating a blind person touching an object on a touch screen.

A non-transitory computer-readable storage medium storing computer readable instructions, the computer readable instructions causing, when executed by one or more processors, the one or more processors to perform steps of the method for simulating a blind person touching an object on a touch screen.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer, the following further describes implementations of this application in detail with reference to the accompanying drawings.

Figures 1, 2:
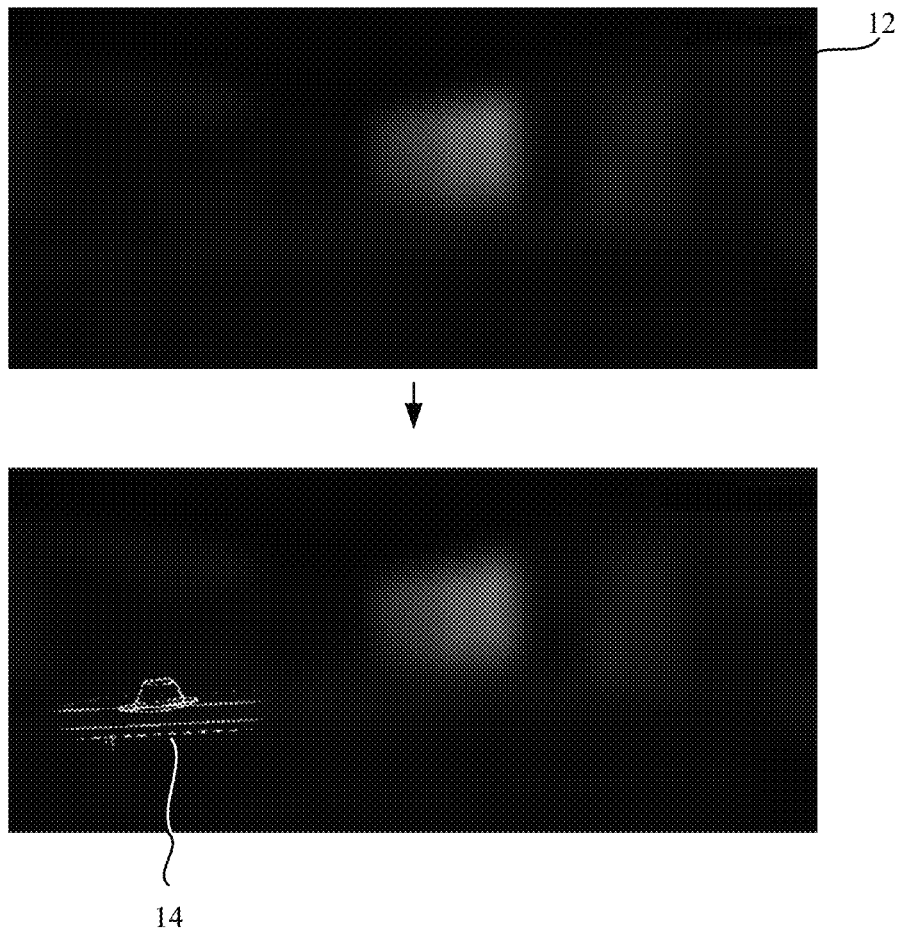
FIG. 1 is a diagram of an interface 1 of an object display method for simulating a feeling of a blind person according to an exemplary embodiment of this application.
FIG. 2 is a flowchart of an object display method for simulating a feeling of a blind person according to an exemplary embodiment of this application.

The embodiments provide an application that allows normal persons to experience a feeling of a blind person. A three-dimensional virtual environment is provided in the application. As shown in FIG. 1, during displaying of an environment picture 12 of the three-dimensional virtual environment in an initial state, a black mask layer is overlaid on the environment picture 12. Therefore, a user cannot directly feel objects in the three-dimensional virtual environment, thus simulating an effect that congenital blind persons cannot feel colors. When the user touches the environment screen 12, a corresponding area on the mask layer removes a masking effect (a circular target area in a lower left corner of FIG. 1), thereby displaying an outline of a hat 14 in the three-dimensional virtual environment. Illustratively, the outline is obtained through contour processing on the hat 14.

Since memory of human brains weakens over time, the circular target area on the mask layer may also gradually shrink over time until the circular target area is closed to the initial state, thus simulating a feeling of gradually forgetting an object in a mind by a blind person after touching the object.

FIG. 2 is a flowchart of an object display method for simulating a feeling of a blind person according to an exemplary embodiment of this application. The method may be performed by a terminal. The terminal is a smart phone, a tablet computer, an augmented display (AR) device, a virtual display (VR) device, a head-mounted display, or the like. An application runs in the terminal. The method includes the following steps:

Step 201: Display a user interface of an application on the touchscreen, the user interface being an interface configured to display a three-dimensional virtual environment including multiple objects, and a mask layer being overlaid on the user interface and exposing a limited region of the three-dimensional virtual environment.

A user starts the application on the terminal, and displays the user interface of the application. The application provides a three-dimensional virtual environment, and the user interface is an interface configured to display the three-dimensional virtual environment. In an illustrative example, the application is developed based on a unity engine.

In some embodiments, the user interface is configured to display an environment picture when observing the three-dimensional virtual environment from a first-person perspective. In an initial state or a default state, a mask layer is further overlaid on the user interface.

The mask layer is configured to mask the environment picture of the three-dimensional virtual environment. In some embodiments, the mask layer is a pure color mask layer, such as a black mask layer for simulating a black world felt by a blind person. In some embodiments, the mask layer is a misty mask layer.

Step 202: Receive an interactive operation triggered by a user on a target area of the user interface on the touchscreen.

The interactive operation is used for perceiving the target area in the user interface. The target area is an area on which the interactive operation is performed.

When the terminal is a terminal having a touch screen, the terminal receives an interactive operation or a sliding operation applied by the user on the touch screen. When the terminal is a terminal having a camera, such as an AR device, a VR device, or a head-mounted display, the terminal receives a gesture operation triggered by the user on the target area of the user interface. A specific form of the interactive operation is not limited in this embodiment.

The target area may be any area on the user interface. The target area may be at least one of a circle, a rectangle, an ellipse, a square, and an irregular shape. In this embodiment, the target area is a circular area, for example. The target area may have a default size (for example, a fixed radius), or may have a changeable size, such as a dynamic size determined according to a range of a touch operation or determined according to a touch force.

Step 203: Display, in the target area according to the interactive operation, an outline of an object located in the three-dimensional virtual environment.

The outline is image information obtained after depicting an edge of the object. In some embodiments, the outline is obtained through contour processing on a three-dimensional object in the three-dimensional virtual environment. In some embodiments, edge pixel points on the outline are determined based on at least one of depth information and normal information of each pixel point on the three-dimensional object. The outline is a wireframe edge or a contour edge.

The application removes a masked part on the target area that is masked by the mask layer, according to the interactive operation, and keeps other masked parts on other areas that are masked by the mask layer except the target area. Since the masked part on the target area is removed, the outline of the object located in the three-dimensional virtual environment is displayed in the target area.

Based on the above, according to the method provided in this embodiment, the mask layer is overlaid on the user interface, the masked part on the target area that is masked by the mask layer is removed according to the interactive operation of the user, and the outline of the object in the three-dimensional virtual environment is displayed in the target area. In this way, an effect of touching an object in the dark by a blind person and presenting a three-dimensional outline of the object in the blind person's mind can be truly simulated.

In an optional embodiment based on FIG. 2, step 203 may optionally include the following steps:

1: Determine at least one candidate object in the three-dimensional virtual environment.

The three-dimensional virtual environment includes a plurality of objects, and the objects may serve as candidate objects.

2: Determine, in the three-dimensional virtual environment according to the target area, a target object within a touchable range, the target object being one or more candidate objects or a part of the candidate object.

The target area is the area corresponding to the interactive operation. In an example of the interactive operation, the target area is a touched area. Since the environment picture is obtained by observing the three-dimensional virtual environment from the first perspective, a camera plane corresponding to the first perspective is a plane in the three-dimensional virtual environment, and therefore the target area is located in the camera plane in the three-dimensional virtual environment.

The application can determine the touchable range in the three-dimensional virtual environment based on the target area. In some embodiments, the touchable range is a three-dimensional spatial range, such as a spherical spatial range.

The application determines candidate objects within the touchable range as the target object.

3: Remove a masked part on the target area that is masked by the mask layer, and display, in the target area, the outline of the target object.

The application removes the masked part on the target area that is masked by the mask layer, colors the outline of the target object, and displays, in the target area, the outline of the colored target object.

Figure 3:
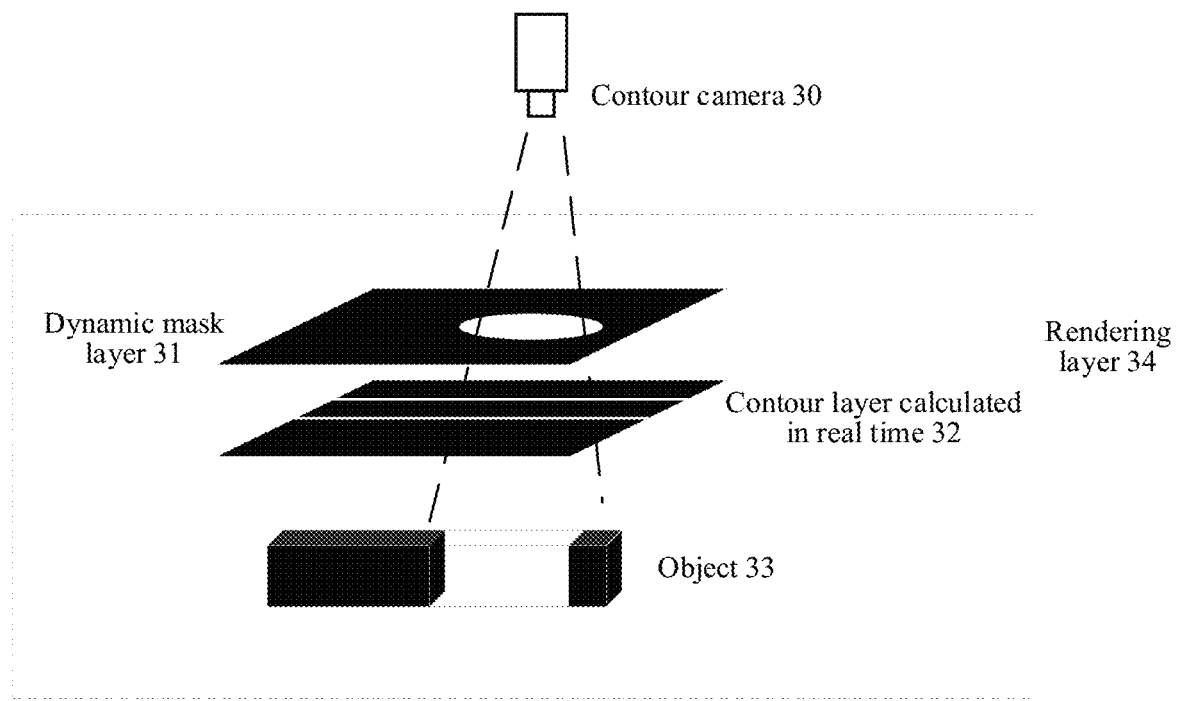
FIG. 3 is a schematic principle diagram of an object display method for simulating a feeling of a blind person according to an exemplary embodiment of this application.

Referring to FIG. 3, a main camera (not shown) and a contour (C) camera 30 are disposed at the same position in the three-dimensional virtual environment. The main camera is configured to capture the environment picture in the three-dimensional virtual environment, which is masked by a dynamic mask layer 31 by default. The dynamic mask layer 31 is completely black in the initial state. After the interactive operation of the user is received, an elliptic gap range is formed. The edge camera 30 is configured to calculate a contour layer 32 in real time. The contour layer 32 is a formed by a contour outline of an object in the touchable range. For an object 33 in the three-dimensional virtual environment, the contour layer 32 performs contour processing on the object 33 located in the touchable range to display an outline of the object 33, and does not process other objects located outside the touchable range.

In an illustrative example, even if a part of the object 33 is in the touchable range and a part is outside the touchable range, the contour layer 32 still performs contour processing on all of the outline of the object 33. Since an elliptical gap range is formed on the dynamic mask layer 31, and other areas except the gap range are still masked, only an outline of the object 33 within the gap range is displayed, and other outlines are still masked.

All of the dynamic mask layer 31, the contour layer 32, and the object 33 are content of a rendering layer 34.

Based on the above, in this embodiment, by determining a three-dimensional targetable area based on the target area, the target object that is touched can be accurately determined based on the targetable area. Since the targetable area is a three-dimensional range, a process of touching the real world by a blind person can be truly simulated.

Figure 4:
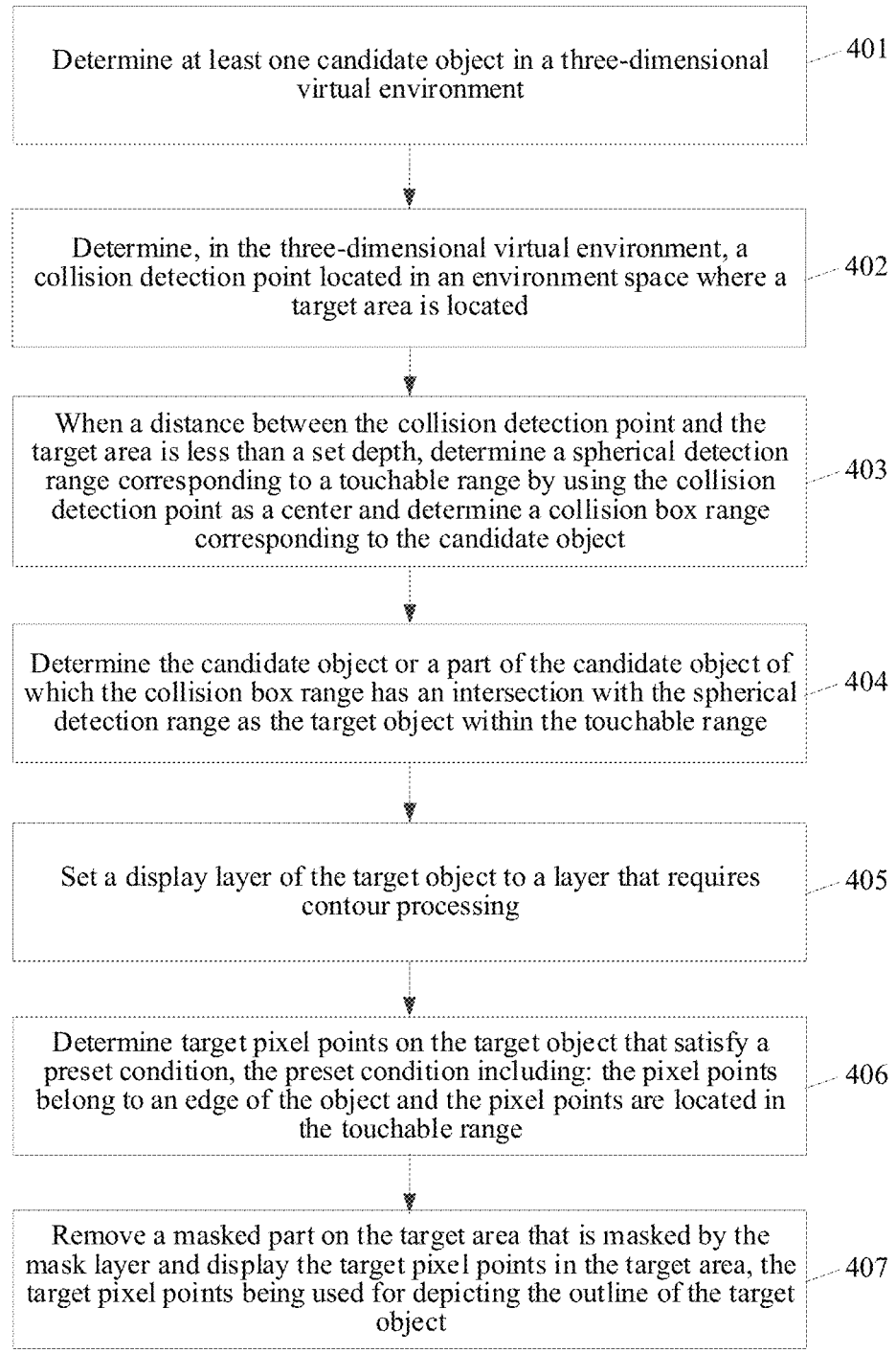
FIG. 4 is another flowchart of an object display method for simulating a feeling of a blind person according to an exemplary embodiment of this application.

In an optional embodiment based on FIG. 2, step 203 may include the following steps shown in FIG. 4:

Step 401: Determine at least one candidate object in the three-dimensional virtual environment.

Step 402: Determine, in the three-dimensional virtual environment, a collision detection point located in an environment space where the target area is located.

With reference to FIG. 3, the environment picture of the three-dimensional virtual environment is a picture obtained by the main camera by observing the three-dimensional virtual environment from the first perspective, and the camera plane is a plane in the three-dimensional virtual environment. The target area formed by the interactive operation of the user is an area located in the camera plane in the three-dimensional virtual environment. The environment space where the target area is located may be a cylindrical space in the three-dimensional virtual environment with the plane where the target area is located as a cross-sectional plane.

Illustratively, the application projects, by using a point (a center point, a uniform sampling point, or a random sampling point), a ray on the target area perpendicular to the camera plane toward the front, and determines a point where the ray first collides with the object as a collision detection point A.

The application determines whether a distance between the collision detection point A and the camera plane is less than a set depth. When the distance is less than the set depth, the collision detection point A is considered as a touchable effective collision detection point A, and step 403 performed. When the distance is not less than the set depth, the collision detection point A is considered as an untouchable ineffective collision detection point A, and subsequent processing of the collision detection point A is stopped.

Step 403: In a case that a distance between the collision detection point and the target area is less than a set depth, determine a spherical detection range corresponding to the touchable range by using the collision detection point as a center, and determine a collision box range corresponding to the candidate object.

When the distance between the collision detection point and the camera plane is less than the set depth (that is, the collision detection point is considered as untouchable when the distance is greater than the set depth), a spherical detection range is generated by using the collision detection point as a center and a preset length R as a radius. The spherical detection range serves as the touchable range.

In addition, each candidate object in the three-dimensional virtual environment further has a corresponding collision box range. The application pre-adds a collision box with a proper size to objects in the three-dimensional virtual environment that need to be touched. For a plurality of child objects, a collision box may be added to their parent object. For example, one collision box may be added as a whole for a plurality of stacked plates. Each collision box has a three-dimensional collision box range.

The application acquires an intersection between the spherical detection range and the collision box range of each object. When there is an intersection between the collision box range of an object and the spherical detection range, the object is considered to be within the touchable range.

Step 404: Determine the candidate object or a part of the candidate object of which the collision box range has an intersection with the spherical detection range as the target object within the touchable range.

When the candidate object in the touchable range includes one candidate object, the target object includes one target object. When the candidate object in the touchable range includes a plurality of candidate objects, the target object includes a plurality of target objects. When a part of a candidate object is in the touchable range, the part of the candidate object is determined as the target object, and a remaining part of the candidate object that is not in the touchable range is not determined as the target object.

Step 405: Set a display layer of the target object to a layer that requires contour processing.

The terminal sets the display layer of the target object to a layer that requires contour processing, and uses each pixel point on the display layer of the target object as a to-be-processed candidate pixel point.

Step 406: Determine, according to the target area, target pixel points on the target object that satisfy a preset condition.

The target object includes many candidate pixel points. The application determines, from the plurality of candidate pixel points, target pixel points on the target object that satisfy the preset condition. In some embodiments, the preset condition includes the following two conditions:

1. The candidate pixel points are edge pixel points.
2. Distances between the candidate pixel points and the target area are less than a threshold.

In some embodiments, condition 2 is that projection of the candidate pixel point in the camera plane is located in the target area.

Candidate pixel points that satisfy both of the two preset conditions are considered as a to-be-rendered target pixel point, that is, an outline of the object that can be observed by the user in the target area on the mask layer.

The application invokes a shader, and the shader colors the target pixel points by using a preset border color. In some embodiments, the preset color is white.

Step 407: Remove the masked part on the target area that is masked by the mask layer, and display, in the target area, the target pixel points, the target pixel points being used for depicting the outline of the target object.

The application sets the masked part on the target area that is masked by the mask layer to be transparent or removes the masked part. Since the masked part is no longer masked, a colored target pixel point may be displayed in the target area. The target pixel points form a wireframe outline of the target object.

Figure 5:
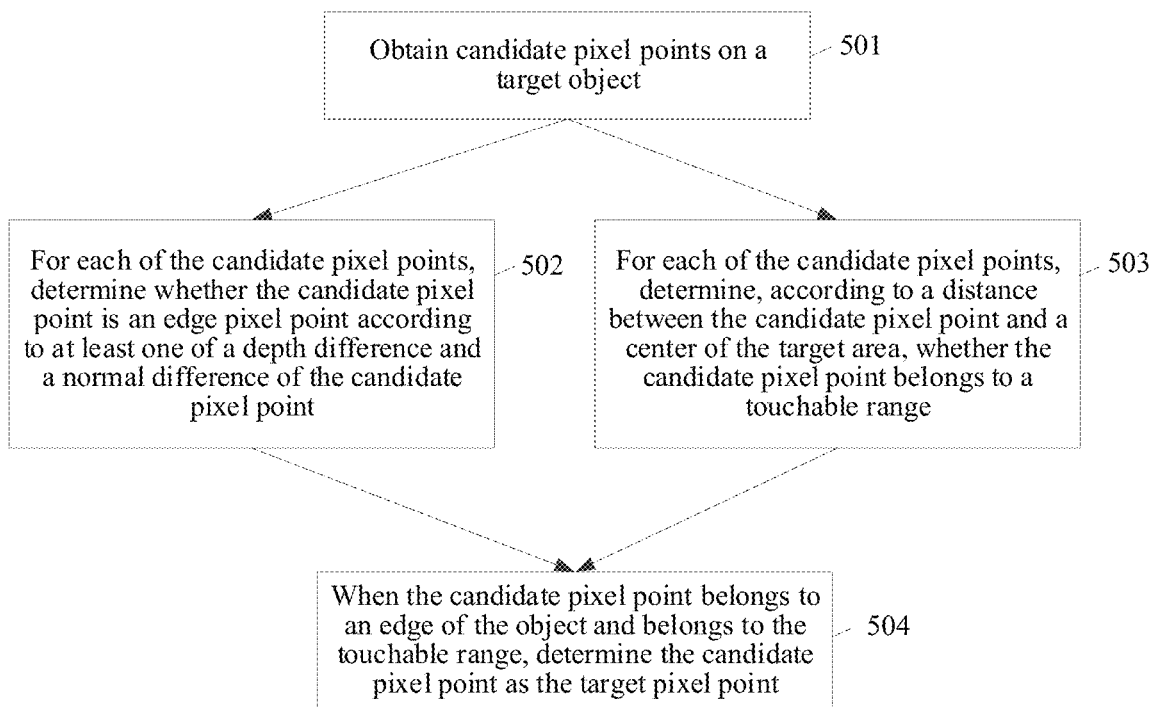
FIG. 5 is another flowchart of an object display method for simulating a feeling of a blind person according to an exemplary embodiment of this application.

In an optional embodiment based on FIG. 4, for step 406, since the object is a three-dimensional object in the three-dimensional virtual environment, the outline of the three-dimensional object may be detected by using a determination method based on a depth difference and a normal difference. Referring to FIG. 5, this step may include the following steps:

Step 501: Obtain candidate pixel points on the target object.

In some embodiments, the candidate pixel points are pixel points on the display layer (surface) of the target object.

Step 502: For each of the candidate pixel points, determine whether the candidate pixel point is an edge pixel point according to at least one of a depth difference and a normal difference of the candidate pixel point.

A depth difference and a normal difference between the candidate pixel point on the target object and two sets of adjacent pixel points are calculated. When the depth difference is greater than a depth threshold and the normal difference is greater than a normal threshold, it is determined that the candidate pixel point is an edge pixel point. When the depth difference is less than the depth threshold or the normal difference is less than the normal threshold, it is determined that the candidate pixel point is not an edge pixel point.

Adjacent pixel points are pixel points on the surface of the target object that are adjacent to the candidate pixel point. The two sets of adjacent pixel points include:

a first set of adjacent pixel points: an upper left pixel point and a lower right pixel point of the candidate pixel point; and a second set of adjacent pixel points: a lower left pixel point and an upper right pixel point of the candidate pixel point.

In some embodiments, the terminal obtains a depth and a normal of each pixel point on the display layer of the target object. The depth refers to a distance of the pixel point relative to the camera plane. The normal is a ray perpendicular to a plane where the pixel point is located that is projected by using the pixel point as a starting point.

When a depth of any pixel point is greatly different from a depth of an adjacent pixel point, and a normal of the pixel point is different from a normal of the adjacent pixel point, the pixel point is probably an edge pixel point. The application may determine the edge pixel point of the target object through at least one of the depth difference and the normal difference.

The depth difference may be determined by using a depth threshold. The depth threshold is a threshold required for control of displaying of the contour outline in depth dimension. The normal difference may be determined by using a normal threshold. The normal threshold is a threshold required for control of displaying of the contour outline in normal dimension.

In some embodiments, the application performs a convolution operation with surrounding pixel points by using a sobel operator to calculate a difference between the pixel points.

In this embodiment, both of the depth difference and the normal difference are used for performing edge detection. In other embodiments, only the depth difference may be used for performing edge detection, or only the normal difference may be used for performing edge detection, which is not limited.

Step 503: For each of the candidate pixel points, determine whether a distance between the candidate pixel point and the target area is less than a threshold.

Since the target object may be relatively large and the target area may be relatively small, not all of the edge pixel points on the target object can be observed from the target area. The application further determines whether the distance between each of the candidate pixel points and the target area is less than the threshold, so as to determine whether the candidate pixel point can be "touched" based on the target area.

In some embodiments, the distance between the candidate pixel point and the target area is expressed by a two-dimensional distance between a projection point of the candidate pixel point in the camera plane and a point (a touch point, a center point, or a nearest edge point) of the target area.

The touch point is a representative point in the target area, which may be a central point or a non-central but representative point. In this embodiment, the target area is a circle, and the center point is a center of the circular target area.

Step 504: When the candidate pixel point belongs to an edge of the object and the distance is less than the threshold, determine the candidate pixel point as the target pixel point.

The target pixel point is a pixel point colored by the shader and displayed, that is, the edge pixel point displayed in the target area.

Based on the above, in this embodiment, by calculating the distance between the candidate pixel point and the target area, the edge pixel point with the distance less than the threshold is determined as the target pixel point, so that the target pixel point which is finally colored is determined based on a position of the target area. When the target area changes according to a sliding action of a user, target pixel points displayed on the user interface also change with the sliding action of the user, thereby achieving dynamic masking.

In an optional embodiment, in order to speed up the displaying of the target pixel points, the steps in the embodiment of FIG. 5 may be implemented as follows. In an optional embodiment based on the above embodiments, a shape of the target area may be at least one of a circle, an ellipse, a square, a rectangle, and an irregular shape. In this embodiment, the target area is a circle or an ellipse, for example. In a default state, the target area is an area with a fixed size. For more realistic simulation, the size of the target area may be dynamically corrected according to a distance between the target object and the target area and a touch force of the user.

In an illustrative example, the terminal determines a first target coefficient according to the distance between the target object and the target area; and corrects the size of the target area by using the first target coefficient. A first correspondence is stored in the terminal, and the first correspondence is a mapping relationship between different distances and different first target coefficients. According to the physical law that everything looks small in the distance and big on the contrary, in the first correspondence, the distance and the first target coefficient are in a positive correlation, that is, a larger distance leads to a larger first target coefficient. The terminal obtains a corrected target area by subtracting the first target coefficient from a radius of the target area.

In other words, for target objects far away from the target area, the target area is reduced; and for target objects close to the target area, the target area is enlarged.

In an illustrative example, a display screen on the terminal is a pressure-sensitive touch screen. The pressure-sensitive touch screen can perceive the touch force of the user and transmit the touch force to the application through an operating system. The terminal determines a second target coefficient according to a touch force of the interactive operation; and corrects the size of the target area by using the second target coefficient. A second correspondence is stored in the terminal, and the second correspondence is a mapping relationship between different touch forces and different second target coefficients. In the second correspondence, the touch force and the second target coefficient are in a positive correlation, that is, a larger touch force leads to a larger second target coefficient. The terminal obtains a corrected target area by adding the second target coefficient to the radius of the target area.

In other words, a smaller touch force of the user leads to a smaller target area; and a larger touch force of the user leads to a larger target area.

In an illustrative example, the terminal determines a third target coefficient according to the distance and the touch force; and corrects the size of the target area by using the third target coefficient. A third correspondence is stored in the terminal, and the third correspondence is a mapping relationship between different distances, different touch forces, and different third target coefficients. The terminal obtains a corrected target area by adding the third target coefficient to the radius of the target area.

In an optional embodiment based on the above embodiments, the above target area disappears after delaying of a time period, and the masking effect is restored, thereby simulating an effect that memory of a tactile feeling disappears from a human brain. In other words, after delaying of a preset time period, the terminal restores masking of the outline of the object in the target area. The restoration process may be sudden restoration after the delaying of the preset period of time, or may be gradual restoration with a gradual change. In case of gradual restoration, the above method further includes the following steps:

Step 1: Start a delay timer according to the interactive operation.

When receiving the interactive operation, the terminal starts a delay timer.

If the interactive operation is a sliding operation that lasts for a time period, it may be determined whether the interactive operation still occurs during calculation of the user interface in each frame. When the interactive operation still occurs, the delay timer is restarted so that the delay timer really takes effect when the interactive operation starts to disappear.

Step 2: During timing of the delay timer, the target area is gradually reduced until the target area disappears.

During the timing of the delay timer, the terminal gradually reduces the target area. For example, the radius (which is also referred to as a maximum displayed contour radius) of the target area is reduced at a radius reduction speed that is a square of a timing duration of the delay timer. In this case, a speed of reduction of the target area is in direct proportionality to the square of the duration of the delay timer.

From visual perspective of the user, the target area is gradually smaller over time until it disappears. The target pixel points displayed in the target area are gradually masked, which is similar to disappearance of memory.

In an optional embodiment based on the above embodiments, step 406 may be implemented as the following steps 1 and 2, and step 407 may be implemented as the following steps 3 and 4.

Step 1: Determine edge pixel points on the target object that belong to the edge of the object according to at least one of a depth difference and a normal difference.

Step 2: Color the edge pixel points by using a preset color to obtain a contour layer, the contour layer having the colored edge pixel points.

Step 3: Determine distances between the colored edge pixel points and the target area.

Step 4: Determine the colored edge pixel points with the distance less than the threshold as the target pixel points displayed in the target area.

Since step 1 and step 2 implement preprocessing of the contour layer and then determine the target pixel points that need to be displayed in the target area, a larger display speed can be obtained by sacrificing a specific amount of calculation.

In an optional embodiment based on the above embodiments, the method is applied to a terminal having a touch screen, and the touch screen has a tactile feedback function. The method further includes:

generating, by the application, a tactile simulation signal according to the outline of the target object displayed in the target area; and invoking, according to the tactile simulation signal, the touch screen to simulate the outline of the target object.

Through the tactile feedback function, an uneven feeling of touch may be simulated by using a vibrator or a liquid layer or an electrode layer on the touch screen. Therefore, the tactile simulation signal invokes a function interface provided by the operating system so that unevenness of the outline of the target object and feelings of different textures are simulated on the touch screen. The touch screen having tactile feedback function may be a touch screen provided in related art.

Figure 6:
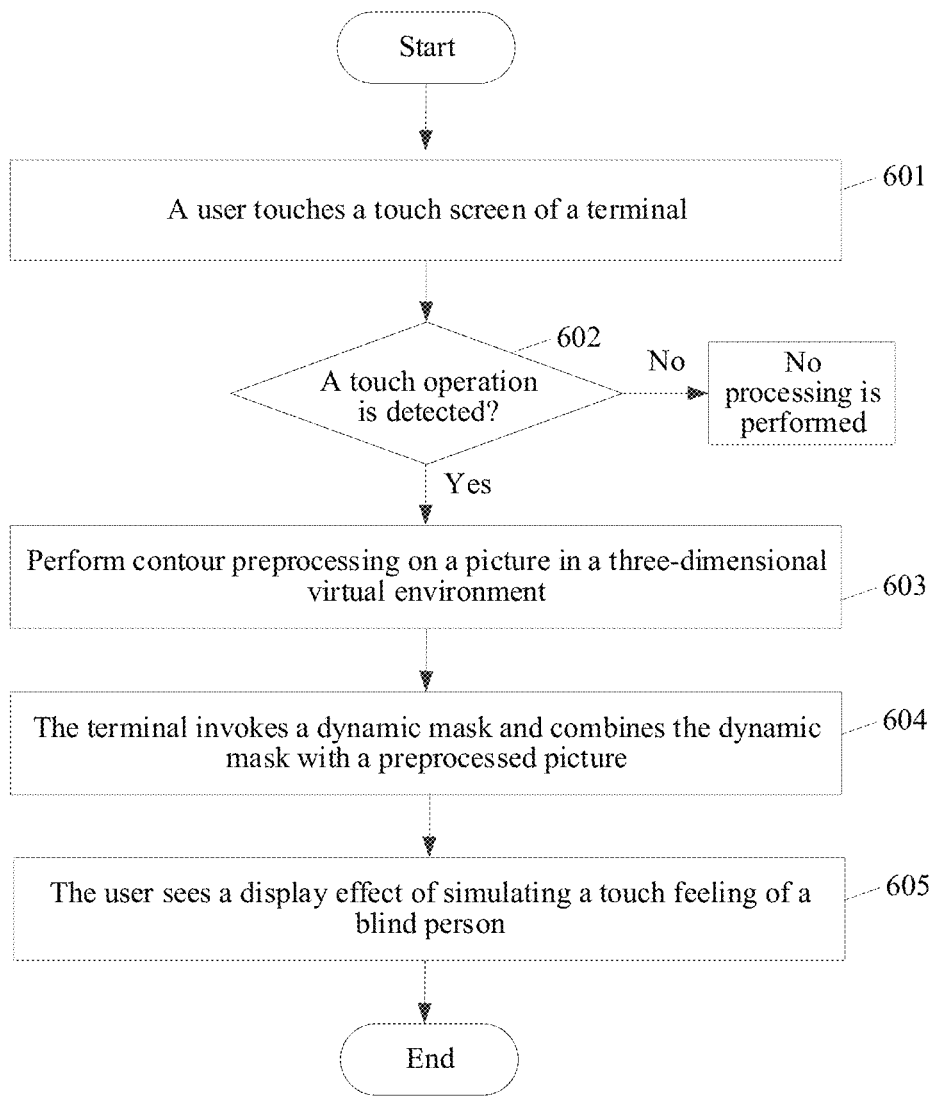
FIG. 6 is another flowchart of an object display method for simulating a feeling of a blind person according to an exemplary embodiment of this application.

FIG. 6 is another flowchart of an object display method for simulating a feeling of a blind person according to an exemplary embodiment of this application. The method may be performed by a terminal having a touch screen. The method includes the following steps:

Step 601: A user touches the touch screen of the terminal.

The touch screen of the terminal generates a touch event according to the interactive operation of the user. The touch event carries coordinates of a touch point.

When the interactive operation is a tap operation, the touch event may include a touch start event and a touch end event.

When the touch event is a sliding operation, the touch event may include a touch start event, at least one touch move event, and a touch end event.

Step 602: The terminal detects whether the interactive operation exists.

The terminal detects whether the interactive operation exists based on the touch event reported by the touch screen. When the interactive operation exists, step 603 is performed. When no touch event exists, the user interface remains unchanged.

Step 603: The terminal performs contour preprocessing on a picture in the three-dimensional virtual environment.

The terminal may calculate three-dimensional objects that may be touched by the user, perform contour preprocessing on the three-dimensional objects that may be touched by the user, and color edge pixel points of the three-dimensional objects to obtain a contour layer.

For example, the terminal may predict objects within a preset depth from the camera plane as the three-dimensional objects that may be touched by the user, perform edge detection on the three-dimensional objects by using at least one of a depth difference and a normal difference to determine the edge pixel points of the three-dimensional objects, and color the three-dimensional objects by using a preset border color.

Step 604: The terminal invokes a dynamic mask and combines the dynamic mask with a preprocessed picture.

The terminal determines a target area on the mask layer according to the coordinates of the touch point in the touch event.

The terminal removes a masked part on the target area of the mask layer according to the interactive operation to form a dynamic mask. The target area on the dynamic mask is set to be transparent or removed, so that the outline of the target object on the contour layer located in the target area is displayed.

Step 605: The user sees a display effect of simulating a touch feeling of a blind person.

Figure 7:
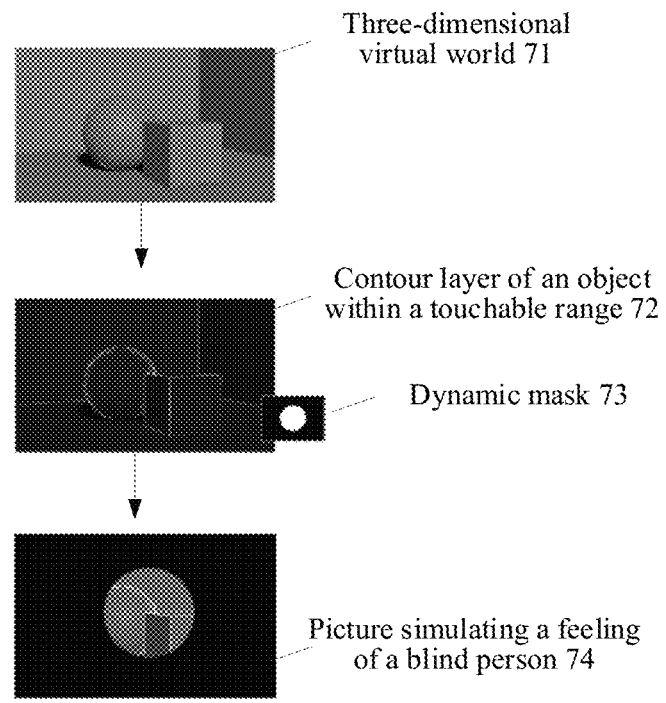
FIG. 7 is a schematic principle diagram of a dynamic mask according to an exemplary embodiment of this application.

Referring to FIG. 7, there are spherical objects and square objects in a three-dimensional virtual world 71. The terminal determines a touchable range in the three-dimensional virtual world 71 according to a target area of the user on the touch screen. A contour layer 72 is generated for objects in the touchable range. The terminal further forms a dynamic mask 73 according to the target area. The dynamic mask 73 may be a black mask layer, the dynamic mask 73 may be opaque or semi-transparent, and masking of a target area on the dynamic mask 73 is removed to form a visible circular area. The terminal combines the dynamic mask 73 with the contour layer 72 to determine an outline of an object that can be displayed in the target area, so as to obtain a picture 74 that simulates a feeling of a blind person.

Figure 8:
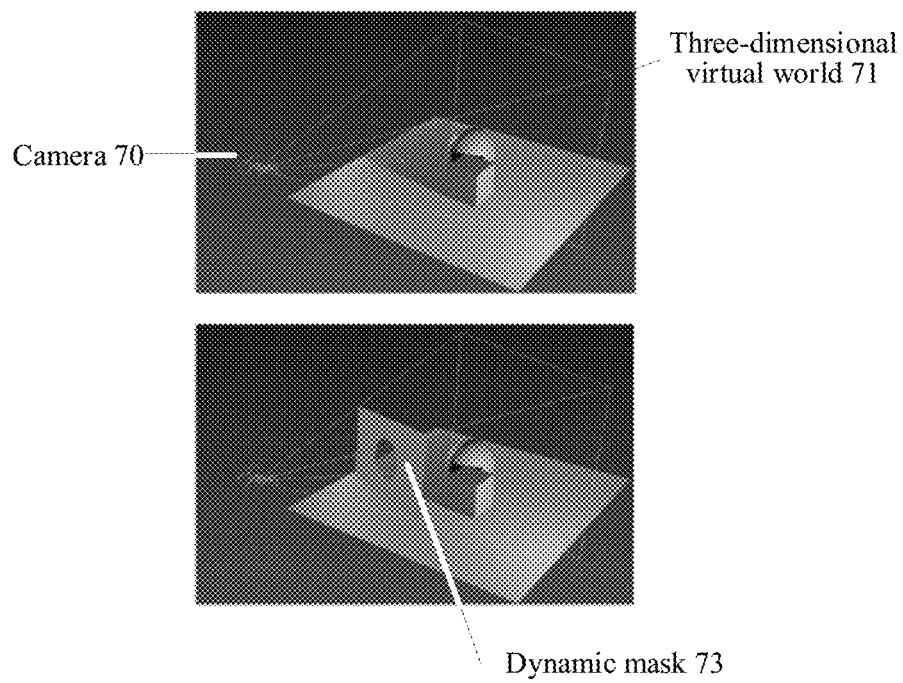
FIG. 8 is a schematic principle diagram of a dynamic mask according to an exemplary embodiment of this application.

FIG. 8 illustrates a camera 70 (a main camera or a contour camera) from another angle. The camera 70 is configured to observe the three-dimensional virtual world 71 from a first perspective, and the dynamic mask 73 is a layer located in front of the camera 70.

Figure 9:
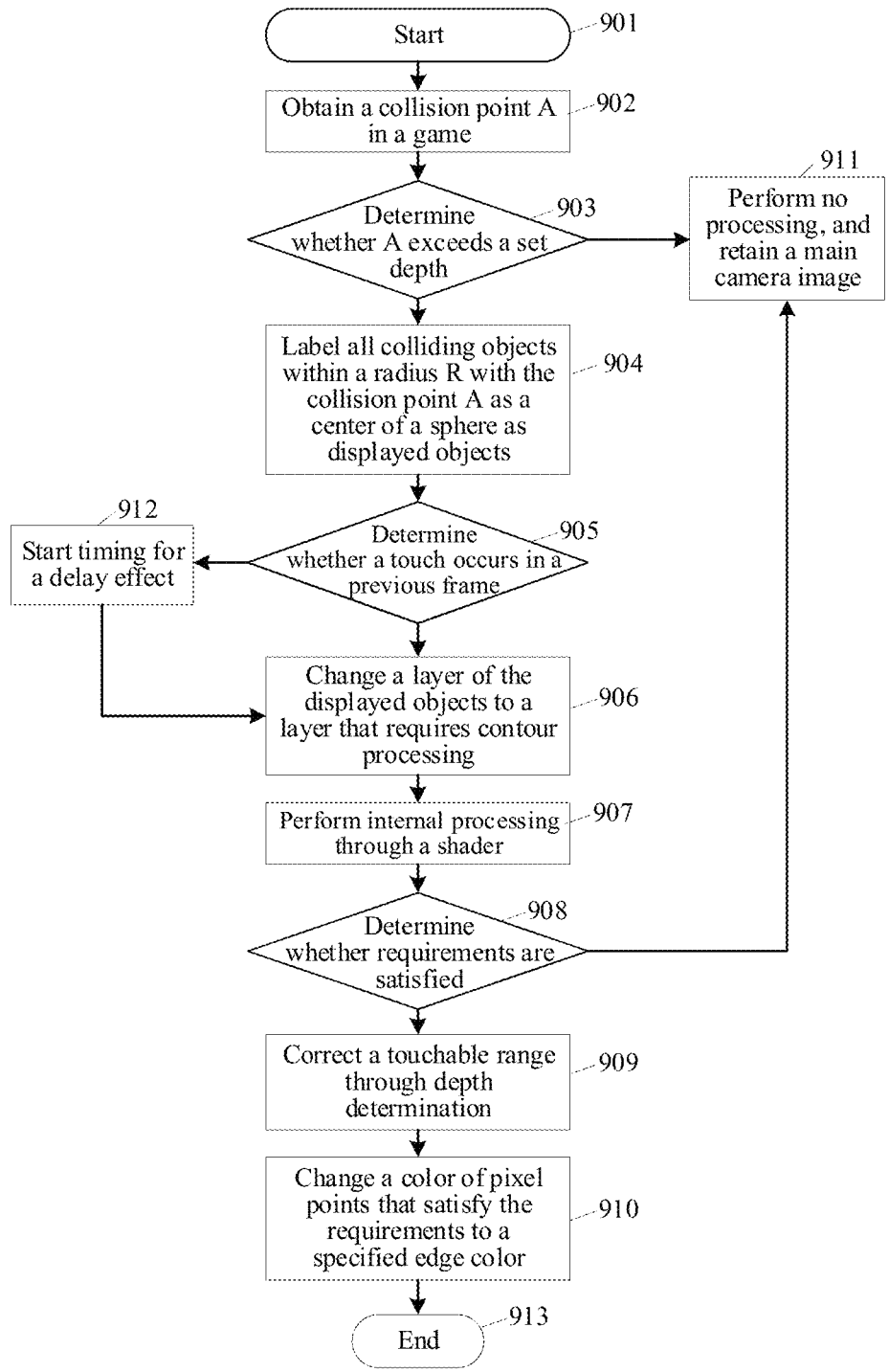
FIG. 9 is a flowchart of an object display method for simulating a feeling of a blind person according to an exemplary embodiment of this application.

FIG. 9 is another flowchart of an object display method for simulating a feeling of a blind person according to an exemplary embodiment of this application. The method may be performed by a terminal having a touch screen. The method includes the following steps:

Step 901: Start.

An application runs in the terminal. An icon of the application is displayed on a desktop of the terminal. The user taps the icon of the application, and the terminal starts the application. The application provides a three-dimensional virtual environment in a three-dimensional form.

After being started, the application displays a three-dimensional virtual environment picture on which a mask layer is overlaid. In some embodiments, the mask layer is a monochromatic mask layer, such as a black mask layer, a green mask layer, a brown mask layer, or the like. In different embodiments, the mask layer may also be a misty mask layer.

Step 902: When an interactive operation exists, determine a collision point A in the application (e.g., a game).

When an interactive operation exists, the terminal determines a target area according to the interactive operation. The terminal determines the collision point A in the application according to a camera plane where the target area is located.

In some embodiments, the terminal moves forward based on the camera plane where the target area is located, and determines a point on the object that a normal first collides with as the collision point A in the application.

Step 903: Determine whether the collision point A exceeds a set depth.

When the set depth is not exceeded, step 904 is performed. When the set depth is exceeded, step 911 is performed.

Step 904: Label all colliding candidate objects within a radius R with the collision point A as a center of a sphere as the target object.

Step 905: Determine whether an interactive operation occurs in a previous frame.

The current determination is to determine whether the delay timer needs to be reset.

When the interactive operation occurs, step 906 is performed. When the interactive operation does not occur, step 911 is performed.

Step 906: Correct a display layer to a layer that requires contour processing.

The terminal corrects the display layer of the target object to a layer that requires contour processing, and performs contour preprocessing on the display layer of the target object. For a process of this step, reference may be made to the description in step 405.

Step 907: Perform internal processing through a shader.

The terminal performs internal processing on edge pixel points on the target object through the shader to obtain the contour layer.

Step 908: Determine whether a preset condition is satisfied.

The terminal determines whether there is a target pixel point in the candidate pixel points on the target object that is located in the touchable range.

When the candidate pixel points that satisfy the requirements exist, step 909 is performed. When the candidate pixel points that satisfy the requirements do not exist, step 911 is performed.

Step 909: Correct the target area through depth determination.

Since the target object and the camera plane where the target area is located are at different distances, the terminal corrects a size of the target area according to a depth of the target object based on the law that everything looks small in the distance and big on the contrary. When the depth of the target object is relatively large, a relatively small target area is used. When the depth of the target object is relatively small, a relatively large target area is used.

Step 910: Correct a color of the target pixel points that satisfy the preset condition to a specified edge color.

The terminal colors the target pixel points in the target area that satisfy the preset condition. For description of the preset condition, reference may be made to the above description shown in FIG. 5.

Step 911. Perform no processing and retain a main camera image.

Step 912: Start timing of the delay timer corresponding to a delay effect.

Step 913: End.

Figure 10:
FIG. 10 is a schematic diagram of an interface after edge detection of a three-dimensional object according to the related art.
Figure 11:
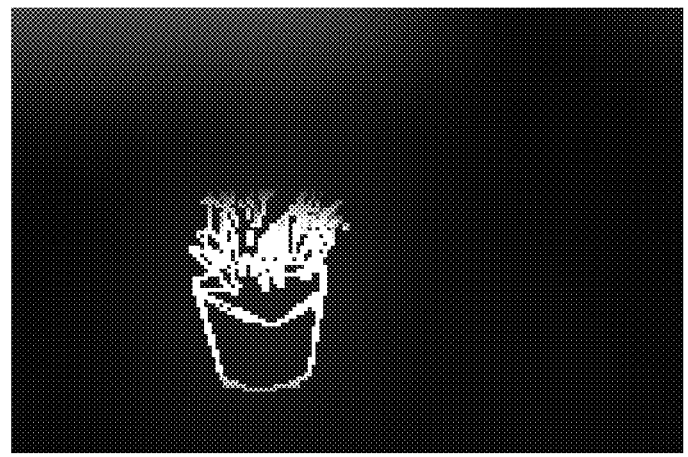
FIG. 11 is a schematic diagram of an interface for displaying a wireframe outline obtained after a three-dimensional object is dynamically masked according to an exemplary embodiment of this application.
Figure 12:
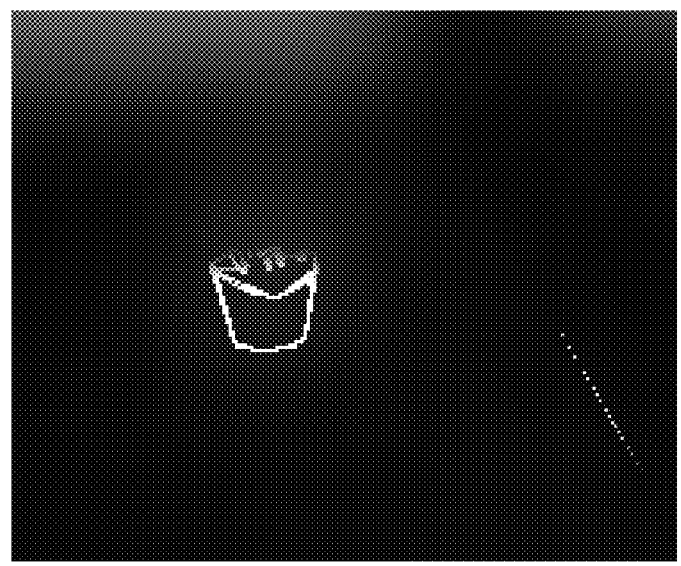
FIG. 12 is a schematic diagram of an interface of an outline of a three-dimensional object during delay disappearance according to an exemplary embodiment of this application.

Since the dynamic mask is used in the embodiments of this application to determine the outline of the object, a visual effect of touching by a blind person can be truly simulated. FIG. 10 shows an object outline detection technology in the related art, through which all outlines of a whole object (a flower pot) are displayed. Compared with the related art, FIG. 11 shows an outline effect displayed in the embodiments of this application, in which only an outline of an object located in the target area (an outline of most of the flowerpot in the figure) is shown, and the target area is gradually smaller, simulating a visual residual effect of a touch feeling, for example, an effect of gradual disappearance of a flowerpot texture after touch in a picture shown in FIG. 12.

The following describes apparatus embodiments of this application, which can be used for executing the method embodiments of this application. For details not disclosed in the apparatus embodiments of this application, refer to the method embodiments of this application.

Figure 13:
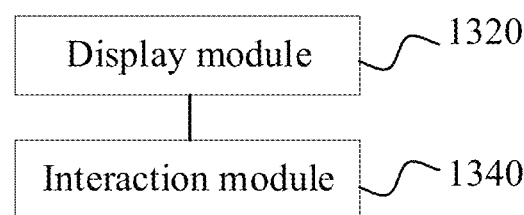
FIG. 13 is a block diagram of an object display apparatus for simulating a feeling of a blind person according to an exemplary embodiment of this application.

FIG. 13 is a block diagram of an object display apparatus for simulating a feeling of a blind person according to an exemplary embodiment of this application. The apparatus may be implemented as all or part of the terminal. The apparatus includes:

a display module 1320 configured to display a user interface of an application, the user interface being an interface configured to display a three-dimensional virtual environment, and a mask layer being overlaid on the user interface; and an interaction module 1340 configured to receive an interactive operation triggered on a target area of the user interface.

The display module 1320 is configured to display, in the target area according to the interactive operation, an outline of an object located in the three-dimensional virtual environment.

Based on the above, according to the apparatus provided in this embodiment, the mask layer is overlaid on the user interface, the masked part on the target area that is masked by the mask layer is removed according to the interactive operation of the user, and the outline of the object in the three-dimensional virtual environment is displayed in the target area. In this way, an effect of touching an object in the dark by a blind person and presenting a three-dimensional outline of the object in the blind person's mind can be truly simulated.

Figure 14:
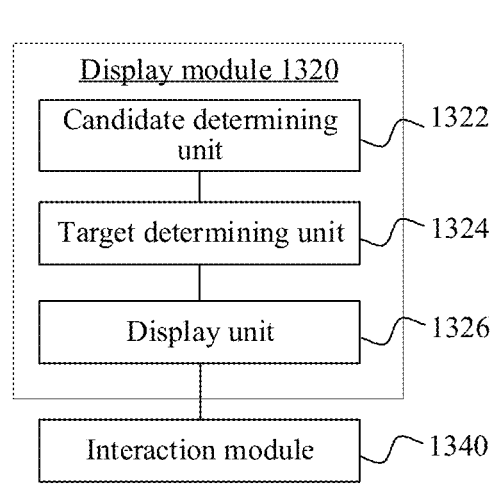
FIG. 14 is another flowchart of an object display method for simulating a feeling of a blind person according to another exemplary embodiment of this application.

In an optional embodiment based on FIG. 13, the display module 1320 includes: a candidate determining unit 1322, a target determining unit 1324, and a display unit 1326 as shown in FIG. 14.

The candidate determining unit 1322 is configured to determine at least one candidate object in the three-dimensional virtual environment.

The target determining unit 1324 is configured to determine, in the three-dimensional virtual environment according to the target area, a target object within a touchable range, the target object being one or more candidate objects or a part of the candidate object.

The display unit 1326 is configured to remove a masked part on the target area that is masked by the mask layer, according to the interactive operation and display, in the target area, the outline of the target object.

In an optional embodiment based on FIG. 13, the target determining unit 1324 is configured to: determine, in the three-dimensional virtual environment, a collision detection point located in an environment space in front of the target area; when a distance between the collision detection point and the target area is less than a set depth, determine a spherical detection range corresponding to the touchable range by using the collision detection point as a center and determine a collision box range corresponding to the candidate object; and determine the candidate object or a part of the candidate object of which the collision box range has an intersection with the spherical detection range as the target object within the touchable range.

In an optional embodiment based on FIG. 13, the display unit 1326 is configured to determine, according to the target area, target pixel points on the target object that satisfy a preset condition; and remove the masked part on the target area that is masked by the mask layer, according to the interactive operation, and display the target pixel points in the target area, the target pixel points being used for depicting the outline of the target object.

The preset condition includes: the pixel points belong to an edge of the object, and distances between the pixel points and the target area are less than a threshold.

In an optional embodiment based on FIG. 13, the display unit 1326 is configured to determine edge pixel points on the target object that belong to the edge of the object according to at least one of a depth difference and a normal difference; color the edge pixel points by using a preset color to obtain a contour layer, the contour layer having the colored edge pixel points; determine distances between the colored edge pixel points and the target area; and determine the colored edge pixel points with the distance less than the threshold as the target pixel points displayed in the target area.

In an optional embodiment based on FIG. 13, the display unit 1326 is configured to determine a first target coefficient according to a distance between the target object and the target area; and correct a size of the target area by using the first target coefficient; or determine a second target coefficient according to a touch force of the interactive operation; and correct a size of the target area by using the second target coefficient; or determine a third target coefficient according to the distance and the touch force; and correct a size of the target area by using the third target coefficient.

In an optional embodiment based on FIG. 13, the display unit 1326 is configured to restore masking of the outline of the object in the target area after delaying of a preset time period.

In an optional embodiment based on FIG. 13, the display unit 1326 is configured to: start a delay timer according to the interactive operation; and during timing of the delay timer, gradually reduce the target area until the target area disappears.

In an optional embodiment based on FIG. 13, a speed of reduction of the target area is directly proportional to a square of a timing duration of the delay timer.

In an optional embodiment based on FIG. 13, the apparatus has a touch screen, and the touch screen has a tactile feedback function. The display unit 1326 is configured to generate a tactile simulation signal according to the outline of the target object displayed in the target area; and invoke, according to the tactile simulation signal, the touch screen to simulate the outline of the target object.

During displaying of the outline of the object by the object display apparatus for simulating a feeling of a blind person provided in the above embodiments, only division of the functional modules is illustrated. In actual application, the functions may be assigned to different functional modules for completion as required. In other words, an internal structure of the device is divided into different functional modules to complete all or a part of the functions described above. In addition, the object display apparatus for simulating a feeling of a blind person provided in the above embodiments and the object display method for simulating a feeling of a blind person are based on the same conception, where the detailed implementation processes are as described in the method embodiments, and is not described in detail herein. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 15:
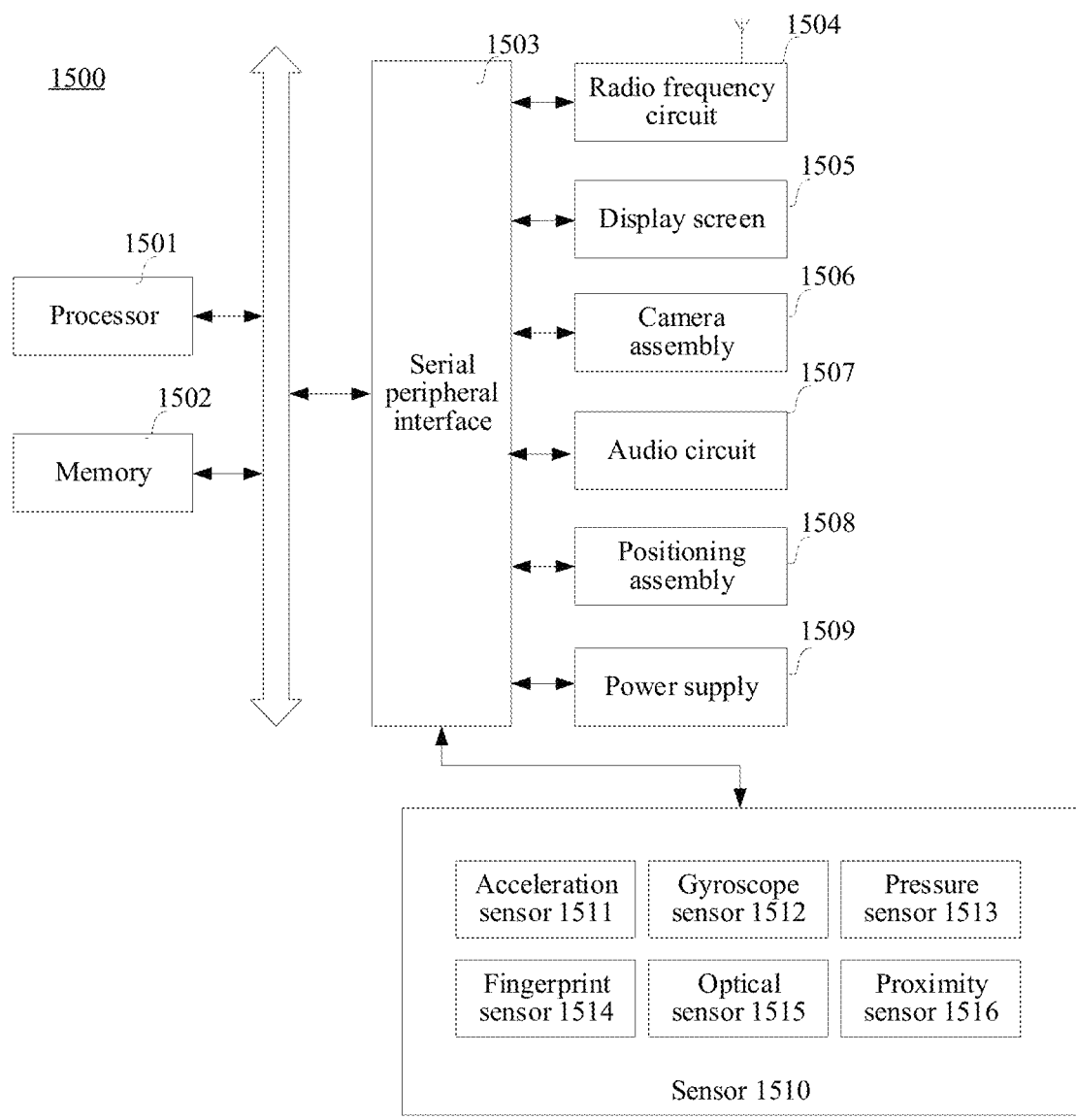
FIG. 15 is a block diagram of a terminal according to an exemplary embodiment of this application.

FIG. 15 is a structural block diagram of a terminal 1500 according to an exemplary embodiment of this application. The terminal 1500 may be a smartphone, a tablet computer, a Moving Picture Experts Group Audio Layer III (MP3) player, a Moving Picture Experts Group Audio Layer IV (MP4) player, a notebook computer, or a desktop computer. The terminal 1500 may also be referred to as another name such as user equipment, a portable terminal, a laptop terminal, or a desktop terminal.

Generally, the terminal 1500 includes a processor 1501 and a memory 1502.

The processor 1501 may include one or more processing cores, for example, a 4-core processor or an 8-core processor. The processor 1501 may be implemented in at least one hardware form of a digital signal processor (DSP), a field-programmable gate array (FPGA), and a programmable logic array (PLA). The processor 1501 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1501 may be integrated with a graphics processing unit (GPU). The GPU is configured to render and draw content that needs to be displayed on a display screen. In some embodiments, the processor 1501 may further include an artificial intelligence (AI) processor. The AI processor is configured to process computing operations related to machine learning.

The memory 1502 may include one or more computer-readable storage media. The computer-readable storage medium may be non-transient. The memory 1502 may further include a high-speed random access memory and a nonvolatile memory, for example, one or more disk storage devices or flash storage devices. In some embodiments, the non-transitory computer-readable storage medium in the memory 1502 is configured to store at least one instruction, and the at least one instruction being configured to be executed by the processor 1501 to implement the method provided in the method embodiments of this application.

In some embodiments, the terminal 1500 may alternatively include: a peripheral interface 1503 and at least one peripheral. The processor 1501, the memory 1502, and the peripheral interface 1503 may be connected through a bus or a signal cable. Each peripheral may be connected to the peripheral interface 1503 through a bus, a signal cable, or a circuit board. Specifically, the peripheral includes: at least one of a radio frequency (RF) circuit 1504, a display screen 1505, a camera component 1506, an audio circuit 1507, a positioning component 1508, and a power supply 1509.

The peripheral interface 1503 may be configured to connect the at least one peripheral related to input/output (I/O) to the processor 1501 and the memory 1502. In some embodiments, the processor 1501, the memory 1502 and the peripheral device interface 1503 are integrated on a same chip or circuit board. In some other embodiments, any one or two of the processor 1501, the memory 1502, and the peripheral device interface 1503 may be implemented on a single chip or circuit board. This is not limited in this embodiment.

The RF circuit 1504 is configured to receive and transmit an RF signal, also referred to as an electromagnetic signal. The RF circuit 1504 communicates with a communication network and other communication devices by using the electromagnetic signal. The RF circuit 1504 converts an electric signal into an electromagnetic signal for transmission, or converts a received electromagnetic signal into an electric signal. In some embodiments, the RF circuit 1504 includes: an antenna system, an RF transceiver, one or more amplifiers, a tuner, an oscillator, a digital signal processor, a codec chip set, a subscriber identity module card, and the like. The RF circuit 1504 may communicate with another terminal by using at least one wireless communication protocol. The wireless communication protocol includes, but is not limited to, a metropolitan area network, generations of mobile communication networks (2G, 3G, 4G, and 5G), a wireless local area network, and/or a wireless fidelity (Wi-Fi) network. In some embodiments, the RF 1504 may further include a circuit related to NFC, which is not limited in this application.

The display screen 1505 is configured to display a user interface (UI). The UI may include a graph, text, an icon, a video, and any combination thereof. In a case that the display screen 1105 is a touch display screen, the display screen 1105 further has a capability of collecting a touch signal on or above a surface of the display screen 1105. The touch signal may be inputted to the processor 1501 as a control signal for processing. In this case, the display screen 1505 may be further configured to provide a virtual button and/or a virtual keyboard that are/is also referred to as a soft button and/or a soft keyboard. In some embodiments, there may be one display screen 1505, disposed on a front panel of the terminal 1500. In some other embodiments, there may be at least two display screens 1505, respectively disposed on different surfaces of the terminal 1500 or designed in a foldable shape. In still some other embodiments, the display screen 1505 may be a flexible display screen, disposed on a curved surface or a folded surface of the terminal 1500. Even, the display screen 1505 may be further set in a non-rectangular irregular pattern, namely, a special-shaped screen. The display screen 1505 may be prepared by using materials such as a liquid crystal display (LCD), an organic light-emitting diode (OLED), or the like.

The camera component 1506 is configured to collect images or videos. In some embodiments, the camera component 1506 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 1506 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1507 may include a microphone and a speaker. The microphone is configured to collect sound waves of a user and an environment, and convert the sound waves into an electrical signal to input to the processor 1501 for processing, or input to the radio frequency circuit 1504 for implementing voice communication. For the purpose of stereo collection or noise reduction, there may be a plurality of microphones, respectively disposed at different portions of the terminal 1500. The microphone may further be an array microphone or an omni-directional collection type microphone. The speaker is configured to convert electric signals from the processor 1501 or the RF circuit 1504 into sound waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1507 may further include an earphone jack.

The positioning component 1508 is configured to determine a current geographic location of the terminal 1500, to implement a navigation or a location based service (LBS). The positioning component 1508 may be a positioning component based on the Global Positioning System (GPS) of the United States, the BeiDou system of China, the GLONASS System of Russia, or the GALILEO System of the European Union.

The power supply 1509 is configured to supply power to components in the terminal 1500. The power supply 1509 may be an alternating current, a direct current, a primary battery, or a rechargeable battery. In a case that the power supply 1509 includes the rechargeable battery, the rechargeable battery may support wired charging or wireless charging. The rechargeable battery may be further configured to support a fast charging technology.

In some embodiments, the terminal 1500 further includes one or more sensors 1510. The one or more sensors 1510 include, but are not limited to: an acceleration sensor 1511, a gyroscope sensor 1512, a pressure sensor 1513, a fingerprint sensor 1514, an optical sensor 1515, and a proximity sensor 1516.

The acceleration sensor 1511 may detect a magnitude of acceleration on three coordinate axes of a coordinate system established with the terminal 1500. For example, the acceleration sensor 1511 may be configured to detect components of gravity acceleration on the three coordinate axes. The processor 1501 may control, according to a gravity acceleration signal collected by the acceleration sensor 1511, the touch display screen 1505 to display the UI in a landscape view or a portrait view. The acceleration sensor 1511 may be further configured to collect motion data of a game or a user.

The gyroscope sensor 1512 may detect a body direction and a rotation angle of the terminal 1500. The gyroscope sensor 1512 may cooperate with the acceleration sensor 1511 to collect a 3D action by the user on the terminal 1500. The processor 1501 may implement the following functions according to the data collected by the gyroscope sensor 1512: motion sensing (such as changing the UI according to a tilt operation of the user), image stabilization at shooting, game control, and inertial navigation.

The pressure sensor 1513 may be disposed at a side frame of the terminal 1500 and/or a lower layer of the display screen 1505. When the pressure sensor 1513 is disposed at the side frame of the terminal 1500, a holding signal of the user on the terminal 1500 may be detected. The processor 1501 performs left and right hand recognition or a quick operation according to the holding signal collected by the pressure sensor 1513. When the pressure sensor 1513 is disposed on the low layer of the touch display screen 1505, the processor 1501 controls, according to a pressure operation of the user on the display screen 1505, an operable control on the UI. The operable control includes at least one of a button control, a scroll-bar control, an icon control, and a menu control.

The fingerprint sensor 1514 is configured to collect a user's fingerprint, and the processor 1501 identifies a user's identity according to the fingerprint collected by the fingerprint sensor 1514, or the fingerprint sensor 1514 identifies a user's identity according to the collected fingerprint. When identifying that the user's identity is a trusted identity, the processor 1501 authorizes the user to perform related sensitive operations. The sensitive operations include: unlocking a screen, viewing encrypted information, downloading software, paying, changing a setting, and the like. The fingerprint sensor 1514 may be disposed on a front surface, a back surface, or a side surface of the terminal 1500. When a physical button or a vendor logo is disposed on the terminal 1500, the fingerprint 1514 may be integrated with the physical button or the vendor logo.

The optical sensor 1515 is configured to collect ambient light intensity. In an embodiment, the processor 1501 may control the display brightness of the touch display screen 1505 according to the ambient light intensity collected by the optical sensor 1515. Specifically, when the ambient light intensity is relatively high, the display brightness of the touch display screen 1505 is increased. When the ambient light intensity is relatively low, the display brightness of the touch display screen 1505 is decreased. In another embodiment, the processor 1501 may further dynamically adjust a camera parameter of the camera component 1506 according to the ambient light intensity collected by the optical sensor 1515.

The proximity sensor 1516, also referred to as a distance sensor, is generally disposed on the front panel of the terminal 1500. The proximity sensor 1516 is configured to collect a distance between the user and the front surface of the terminal 1500. In an embodiment, when the proximity sensor 1516 detects that the distance between the user and the front surface of the terminal 1500 gradually becomes smaller, the display screen 1505 is controlled by the processor 1501 to switch from a screen-on state to a screen-off state. In a case that the proximity sensor 1516 detects that the distance between the user and the front surface of the terminal 1500 gradually becomes larger, the display screen 1505 is controlled by the processor 1501 to switch from the screen-off state to the screen-on state.

A person skilled in the art may understand that the structure shown in FIG. 15 constitutes no limitation on the terminal 1500, and the terminal may include more or fewer components than those shown in the figure, or some components may be combined, or a different component deployment may be used.

The embodiments of this application further provide a non-volatile computer storage medium. The storage medium stores computer-readable instructions, and the computer-readable instructions are executed by a processor to implement the above object display method for simulating a feeling of a blind person according to the various embodiments.

The embodiments of this application further provide a computer program product. When the computer program product is run on a terminal, the terminal executes the above object display method for simulating a feeling of a blind person.

"Plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely preferred embodiments of this application, and are not intended to limit this application. Any modification, equivalent replacement, improvement and the like made within the spirit and principle of this application shall fall within the protection scope of this application.

What is claimed is:

1. A method for simulating a blind person touching an object on a touch screen performed by a terminal having a processor and memory storing a plurality of programs to be executed by the processor, the method comprising:
    displaying a user interface of an application on the touchscreen, the user interface being an interface configured to display a three-dimensional virtual environment including multiple objects, and a mask layer being overlaid on the user interface and exposing a limited region of the three-dimensional virtual environment;
    receiving an interactive operation triggered by a user on a target area of the user interface on the touchscreen;
    displaying, in the target area according to the interactive operation, an outline of an object located in the three-dimensional virtual environment; and
    restoring masking of the outline of the object in the target area after a preset time period since the masking was removed.

2. The method according to claim 1, wherein the displaying, in the target area according to the interactive operation, an outline of an object located in the three-dimensional virtual environment comprises:
    determining at least one candidate object among the multiple objects in the three-dimensional virtual environment;
    determining, in the three-dimensional virtual environment according to the target area, a target object within a touchable range, the target object being one or more candidate objects, and the target object being an entirety or a part of the candidate object; and
    removing a masked part on the target area that is masked by the mask layer, according to the interactive operation and displaying, in the target area, the outline of the target object.

3. The method according to claim 2, wherein the determining, in the three-dimensional virtual environment according to the target area, a target object within a touchable range comprises:
    determining, in the three-dimensional virtual environment, a collision detection point located in an environment space where the target area is located;
    when a distance between the collision detection point and the target area is less than a set depth, determining a spherical detection range corresponding to the touchable range by using the collision detection point as a center and determining a collision box range corresponding to the candidate object; and
    determining the candidate object or a part of the candidate object of which the collision box range has an intersection with the spherical detection range as the target object within the touchable range.

4. The method according to claim 3, wherein an environment picture of the three-dimensional virtual environment comprises a camera plane; and the determining, in the three-dimensional virtual environment, a collision detection point located in an environment space where the target area is located comprises:
    projecting a ray from a preset point in the camera plane that is located in the target area in a direction perpendicular to the camera plane and determining a point where the ray collides with the object in the three-dimensional virtual environment as the collision detection point, the preset point comprising a center point, a uniform sampling point, or a random sampling point.

5. The method according to claim 2, wherein the removing a masked part on the target area that is masked by the mask layer, according to the interactive operation and displaying, in the target area, the outline of the target object comprises:
    determining, according to the target area, target pixel points on the target object that satisfy a preset condition, removing the masked part on the target area, that is masked by the mask layer according to the interactive operation, and displaying the target pixel points in the target area, the target pixel points being used for depicting the outline of the target object.

6. The method according to claim 5, wherein the preset condition comprises:
the pixel points belong to an edge of the object, and distances between the pixel points and the target area are less than a threshold.

7. The method according to claim 6, wherein the determining target pixel points on the target object that satisfy a preset condition comprises:
determining edge pixel points on the target object that belong to the edge of the object according to at least one of a depth difference and a normal difference; and
coloring the edge pixel points by using a preset color to obtain a contour layer, the contour layer having the colored edge pixel points; and
the displaying the target pixel points in the target area comprises:
determining distances between the colored edge pixel points and the target area; and
determining the colored edge pixel points with the distance less than the threshold as the target pixel points displayed in the target area.

8. The method according to claim 3, further comprising:
determining a first target coefficient according to a distance between the target object and the target area, and correcting a size of the target area by using the first target coefficient.

9. The method according to claim 1, further comprising:
determining a second target coefficient according to a touch force of the interactive operation on the touch screen; and
correcting a size of the target area by using the second target coefficient.

10. The method according to claim 3, further comprising:
determining a third target coefficient according to a distance between the target object and the target area and a touch force of the interactive operation on the touch screen; and
correcting a size of the target area by using the third target coefficient.

11. The method according to claim 10, the correcting a size of the target area by using the third target coefficient comprises:
adding the third target coefficient to a radius of the target area to obtain a corrected target area.

12. The method according to claim 1, wherein the restoring masking of the outline of the object in the target area after a preset time period since the masking is removed comprises:
starting a delay timer according to the interactive operation; and
during timing of the delay timer, gradually reducing the target area until the target area disappears, so as to restore the masking of the outline of the object in the target area.

13. The method according to claim 12, wherein a speed of reduction of the target area is directly proportional to a square of a timing duration of the delay timer.

14. The method according to claim 1, wherein the touch screen has a tactile feedback function, and the method further comprises:
generating a tactile simulation signal according to the outline of the target object displayed in the target area; and
invoking, according to the tactile simulation signal, the touch screen to simulate the outline of the target object.

15. A terminal, comprising:
a processor and a memory storing a plurality of programs being loaded and executed by the processor to perform a method for simulating a blind person touching an object on a touch screen of the terminal by implementing a plurality of operations including:
displaying a user interface of an application on the touchscreen, the user interface being an interface configured to display a three-dimensional virtual environment including multiple objects, and a mask layer being overlaid on the user interface and exposing a limited region of the three-dimensional virtual environment;
receiving an interactive operation triggered by a user on a target area of the user interface on the touchscreen;
displaying, in the target area according to the interactive operation, an outline of an object located in the three-dimensional virtual environment; and
restoring masking of the outline of the object in the target area after a preset time period since the masking was removed.

16. The terminal according to claim 15, wherein the displaying, in the target area according to the interactive operation, an outline of an object located in the three-dimensional virtual environment comprises:
determining at least one candidate object among the multiple objects in the three-dimensional virtual environment;
determining, in the three-dimensional virtual environment according to the target area, a target object within a touchable range, the target object being one or more candidate objects, and the target object being an entirety or a part of the candidate object; and
removing a masked part on the target area that is masked by the mask layer, according to the interactive operation and displaying, in the target area, the outline of the target object.

17. The terminal according to claim 15, wherein the touch screen has a tactile feedback function, and the plurality of operations further comprise:
generating a tactile simulation signal according to the outline of the target object displayed in the target area; and
invoking, according to the tactile simulation signal, the touch screen to simulate the outline of the target object.

18. A non-transitory computer readable storage medium, storing a plurality of programs being loaded and executed by a processor of a terminal to perform a method for simulating a blind person touching an object on a touch screen of the terminal by implementing a plurality of operations including:
displaying a user interface of an application on the touchscreen, the user interface being an interface configured to display a three-dimensional virtual environment including multiple objects, and a mask layer being overlaid on the user interface and exposing a limited region of the three-dimensional virtual environment;
receiving an interactive operation triggered by a user on a target area of the user interface on the touchscreen;
displaying, in the target area according to the interactive operation, an outline of an object located in the three-dimensional virtual environment; and
restoring masking of the outline of the object in the target area after a preset time period since the masking was removed.

19. The non-transitory computer readable storage medium according to claim 18, wherein the restoring masking of the outline of the object in the target area after a preset time period since the masking is removed comprises:

starting a delay timer according to the interactive operation; and during timing of the delay timer, gradually reducing the target area until the target area disappears, so as to restore the masking of the outline of the object in the target area.

20. The non-transitory computer readable storage medium according to claim 18, wherein the touch screen has a tactile feedback function, and the plurality of operations further comprise:

generating a tactile simulation signal according to the outline of the target object displayed in the target area; and invoking, according to the tactile simulation signal, the touch screen to simulate the outline of the target object.

\* \* \* \* \*